Jan. 25, 1944.　　　　N. W. LYON　　　　2,339,866
BOTTLE HOODING MACHINE
Filed March 1, 1940　　　　8 Sheets-Sheet 1

INVENTOR
*Norman W. Lyon*
BY *Chapin & Neal*
ATTORNEYS

Jan. 25, 1944.   N. W. LYON   2,339,866
BOTTLE HOODING MACHINE
Filed March 1, 1940   8 Sheets-Sheet 4

Patented Jan. 25, 1944

2,339,866

UNITED STATES PATENT OFFICE 2,339,866

BOTTLE HOODING MACHINE

Norman W. Lyon, Springfield, Mass., assignor to Package Machinery Company, Springfield, Mass., a corporation of Massachusetts Application March 1, 1940, Serial No. 321,729

7 Claims. (Cl. 226—80)

This invention relates to a bottle hooding machine such as for applying Cellophane hoods to milk bottles and the like, and is embodied in a new design employing certain features described in my copending application Serial No. 267,459, which has been issued as Patent No. 2,258,185. As distinguished from the turret type of machine disclosed in the aforesaid application, the present machine is a single header machine in that there is contemplated for cooperation with the mechanism herein shown only one hood applying mechanism operating in a fixed location and with respect to which the bottles are fed in and out of the machine.

The principal object of the invention is to provide simple and economically constructed mechanism which will be rapid and efficient in operation. An important feature of novelty is the extreme simplicity of the changes required for adapting the machine to handle bottles of different sizes, viz., quart sizes or pint sizes, etc. All that is involved in such a change is the replacement of a readily detachable jaw piece of the transfer member and the adjustment of certain side rails.

A further feature of novelty resides in the parallel arrangement of the bottle conveyors, one at each side of the elevator platform and acting in conjunction with transfer mechanism which moves the bottles successively and in properly timed relation from one conveyor to the other across the intervening elevator platform during which the hoods are applied thereto. The elevator platform and transfer member have intercepting paths of movement but they are timed for non-interference. Any accidental blocking of their movement which would cause interference is accommodated by an alternative yielding action which thus prevents any possibility of breakage or unnecessary stoppage of the machine.

It should be understood that inasmuch as the hood applying mechanism and web feed mechanism employed in the upper part of the present machine are as shown in my aforesaid copending case, they are not illustrated here. In the present disclosure it is only necessary to show enough of the machine to make clear the connection to said other undisclosed mechanism.

Referring to the accompanying drawings, which show the preferred embodiment of my invention.

Referring to the drawings more particularly, the main supporting frame for the machine is of table-like form, comprising a top 1 and legs 2. Rising from the rear of the table are a pair of vertical supporting posts 3 and 4. It is to be understood that on the upper part of these vertical posts 3 and 4 and not shown in the drawings of the present application, there is slidably mounted for vertical adjustment a carrier frame similar in construction to that shown in my aforesaid copending case, and upon which there is carried a single header overhanging the bottle elevator platform shown herein and about to be described. The header comprises hood applying mechanism and tape applicator mechanism of the same construction as shown in said copending case. The carrying frame will also support a supply of hooding material such as Cellophane, and feed mechanism therefor which will present a hood in proper timed relation to the bottle when it is moved upwardly by the elevator platform to the header, all of which mechanism is fully disclosed in my aforesaid copending case. Inasmuch as the above described mechanism is the same as in my copending case it is not shown herein.

Also rising from the rear of the table top 1 is a shaft housing 5 through which extends the main vertical driving column of the machine. This driving column comprises in part the stub shaft 10 which extends upwardly out from the gear reduction box 9. The usual gear reduction mechanism in said box 9 is operated by pulley 8, belt 7, and motor pulley 6, from a driving motor, not shown. Fixed to the stub shaft 10 is a tubular shaft 11 and in the upper part of tubular shaft 11 there is contained a drive shaft 12 which is free to slide up and down in shaft 11 and is also not keyed for rotation therewith.

It will be understood that from the upper part of this drive shaft 12 (not shown) the driving connections are taken for operating the aforementioned web feed mechanism and header applicator mechanism. Since in the operation of this machine it is desirable not to operate the web feed mechanism or the header applicator mechanism when no bottle is presented for having a hood applied thereto, I have arranged that the aforesaid vertical drive shaft 12 shall be coupled in such manner to the tubular drive shaft 11 that said shaft 12 will be driven only when a bottle is properly presented to the machine for having a hood applied thereto.

It also will be understood that machines of this character are to be made adaptable to bottles of different size and height and that the upper carrying frame (not shown) is slidably mounted on the posts 3 and 4 for being fixed in various adjusted vertical positions thereon. The mechanism for adjusting this carrying frame is partially shown in Fig. 3 by the bevel gears 13 and 14, it being understood that the bevel gear 14 is driven by hand crank at one side of the machine and bevel gear 13 will carry an elevating screw lift stem for the adjustment of said carrier frame.

Rising from the front part of the table top 1 is a pedestal 22 upon which is supported in parallel relation conveyor frames 17 and 19. Upon said frames respectively are mounted link belt conveyors 16 and 18, said conveyors being driven in the direction of the arrows shown in Fig. 2, the conveyor 16 being the infeed conveyor for bottles, and the conveyor 18 being the outfeed conveyor for bottles. A transfer plate 20 joins the conveyor frames 17 and 19 across which bottles are adapted to be slid or transferred from the infeed conveyor 16 to the outfeed conveyor 18 by mechanism to be described. A triangular opening 21 is formed in the transfer plate 20 through which opening a bottle elevator platform 15 is adapted to be moved vertically in the carrying of bottles upwardly for presentation to the hood applying mechanism (not shown).

An outer guide rail 23 is fixed to the conveyor frame 19 for the guidance of bottles traveling outwardly on the outfeed conveyor. A similar outer guide rail 24 is fixed to bracket 26 of the conveyor frame 17 for bottles traveling on the infeed conveyor. An adjustable inner guide rail 25 for conveyor 16 is carried on a bracket slide piece 27 which is mounted in slidable relation on the bracket 26 whereby said guide rail 25 may be adjusted toward and away from the guide rail 24 to accommodate bottles of different sizes. The clamp 27a is employed to fix the adjustment of said slide piece 27 and guide rail 25. The guide rail 25 has integral with its inner end a higher portion 25a inclined at an angle to the rail 25, which serves to guide the bottles during their transfer across plate 20, and on and off the elevator platform 15. The guide rail 25 with its integral portion 25a is adjustable for lengthwise positioning upon the bracket slide piece 27 to accommodate bottles of different sizes. A clamp nut 27b is employed to fix this adjustment.

Figures 1, 6, 7:
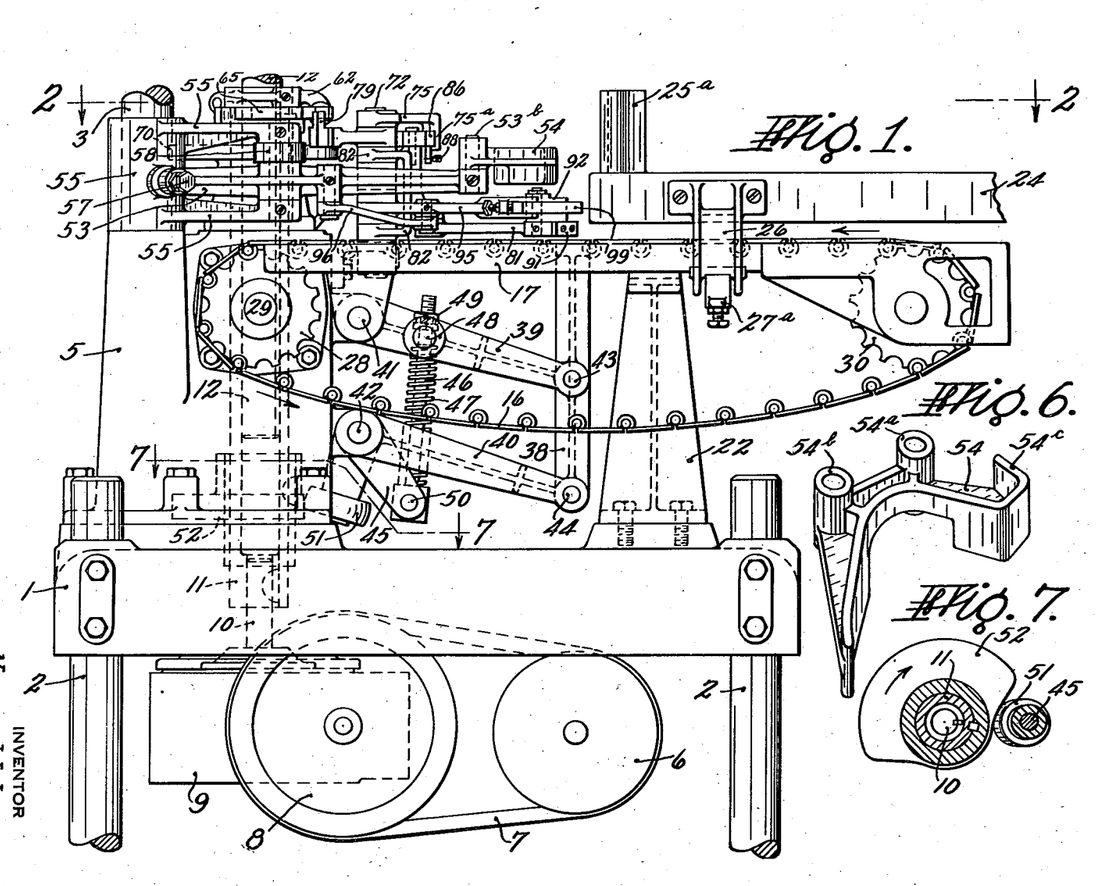
Fig. 1 is a side elevation of the lower part of the complete machine, the upper part of the machine being omitted.
Fig. 6 is a detached view in perspective of the container engaging jaw.
Fig. 7 is a detail plan of the elevator operating cam as it would appear in a sectional view taken along line 7—7 of Fig. 1.
Figure 2:
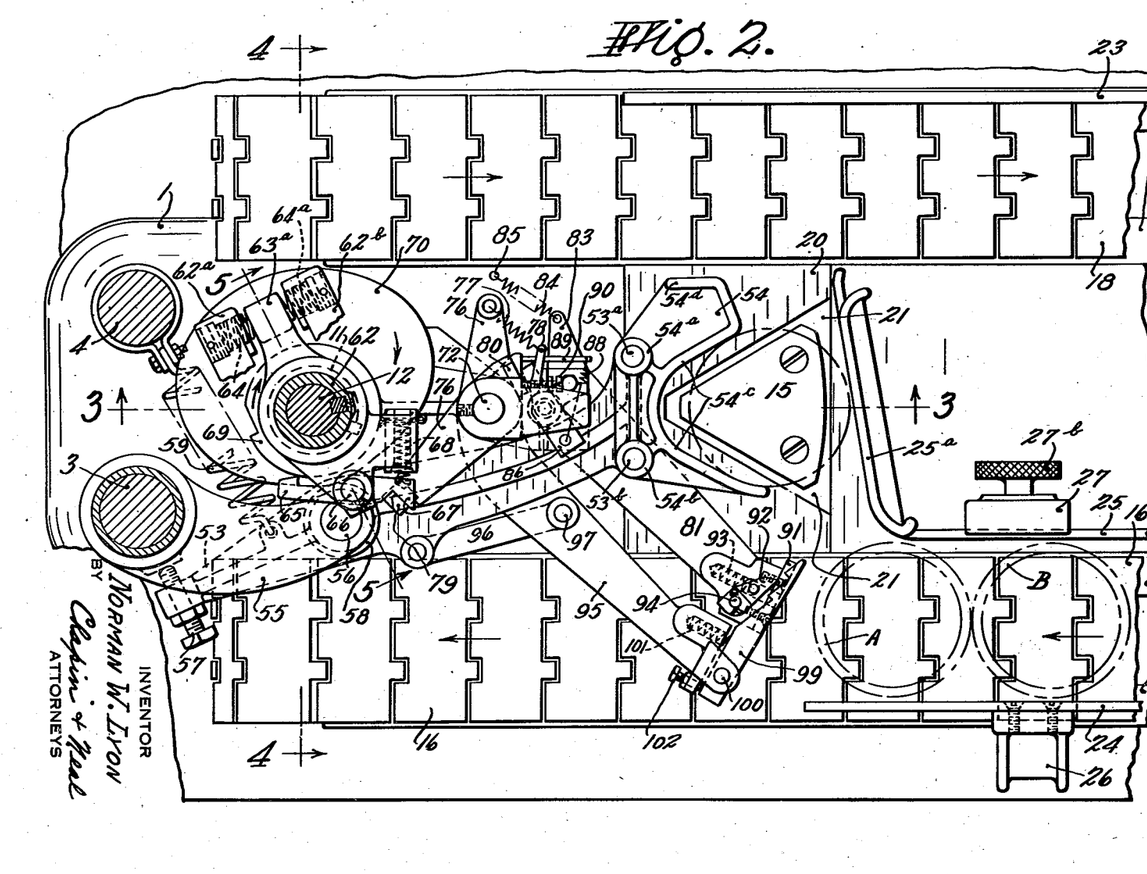
Fig. 2 is a plan view such as would be seen from a horizontal sectional view of the machine taken along line 2—2 of Fig. 1.
Figures 4, 5:
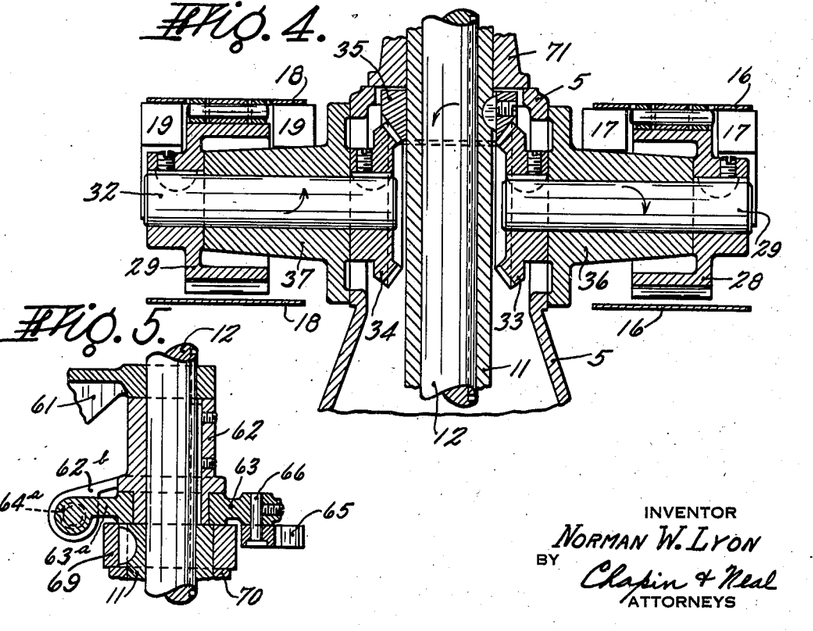
Fig. 4 is a transverse sectional view along line 4—4 of Fig. 2.
Fig. 5 is a detail sectional view along line 5—5 of Fig. 2.

As shown in Fig. 4, the infeed conveyor 16 is driven by a sprocket 28 keyed to stub shaft 29, mounting in the bearing boss 36 which projects laterally from the housing 5. The inner end of said shaft 29 has fixed thereto bevel gear 33 which is driven from bevel gear 35 fixed to the tubular driving shaft 11. The other end of the infeed conveyor 16 travels around idle pulley or sprocket 30 as shown in Fig. 1. The outfeed conveyor 18 is mounted in a similar manner and is driven from sprocket 29 fixed to stub shaft 32 mounted in the bearing boss 37 which projects from said housing 5. The inner end of shaft 32 has fixed thereto bevel gear 34 driven from the above mentioned gear 35. It is obvious from the foregoing description of the driving connections that the infeed and outfeed conveyors will be moved in directions opposite to one another; in other words in the directions of their respective arrows as indicated in Fig. 2.

The bottle elevator platform 15 in its lower position lies with its upper surface flush with the surface of the transfer plate 20, and said plate 20 in turn is flush with the upper surface of infeed and outfeed conveyors 16 and 18 whereby a bottle may be readily slid from said conveyor 16 across plate 20 onto the elevator platform 15 and in a similar manner slid from said platform across plate 20 to said outfeed conveyor 18. The platform is of triangular shape to approximately fit the opening 21 in plate 20 all for a purpose as will be hereafter described.

The elevator platform 15 is carried on a vertical strut 38 for being given its up and down movement. The strut 38 is carried on parallel swinging levers 39 and 40 which are respectively mounted on fulcrum pivots 41 and 42 and have pivotal connections 43 and 44 with said strut 38. A bell crank lever 45 also mounted on the fulcrum pivot 42 is employed for operating the swinging levers 39 and 40. For this purpose the bell crank lever has connected thereto at 50 a spring guide rod 46 which is slidably received in a swivel boss 48 on said lever 39. A stop nut 49 is screw threaded on the outer end of the rod 46 to limit the movement of said rod with respect to the swivel boss 48. A spring 47 is interposed between said swivel boss 48 and pivot connection 50, tending to keep the levers 39 and 40 to the upper limit of their travel on rod 46. It will be apparent that the function of the spring 47 is to transmit motion from the bell crank 45 to the lever 39 with a yielding push. Consequently if there is any interference with the upward movement of platform 15, the effect is merely to compress spring 47. The bell crank lever 45 carries a cam roller 51 which works on the periphery of elevator operating cam 52 which is fixed to the tubular drive shaft 11 whereby the proper up and down movement is imparted to the said elevator platform 15. The weight of the platform 15 and connected parts keeps the roller 51 in contact with cam 52. Thus it will be observed that said platform 15 is not positively driven in either direction. When its upward movement is interfered with it may yield because of spring 47, and its downward movement when interfered with merely holds roller 51 away from its actuating cam 52.

A transfer member is employed to shift the bottles to and from the elevator platform 15 and comprises a lever 53 pivotally carried at knuckle joint 56 on a swing arm 55 of bifurcated form which in turn is pivotally hung on the vertical post 3. Normally the lever 53 and swing arm 55 move together as a unit but may "jack-knife" on joint 56 when occasion requires. An adjustable screw stud 57 is carried at the rear end of the transfer lever 53 for abutting the hub of said swing arm 55, and a roller 58 on said pivot 56 is adapted to bear and work against the periphery of the operating cam 70 which is fixed to the tubular shaft 11. A spring 59 is connected between said transfer lever 53 and the stationary post 4 tending to keep the roll 58 in contact with the cam 70, and also tending to keep the screw stud 57 in contact with the hub of said swing arm 55.

Figure 11:
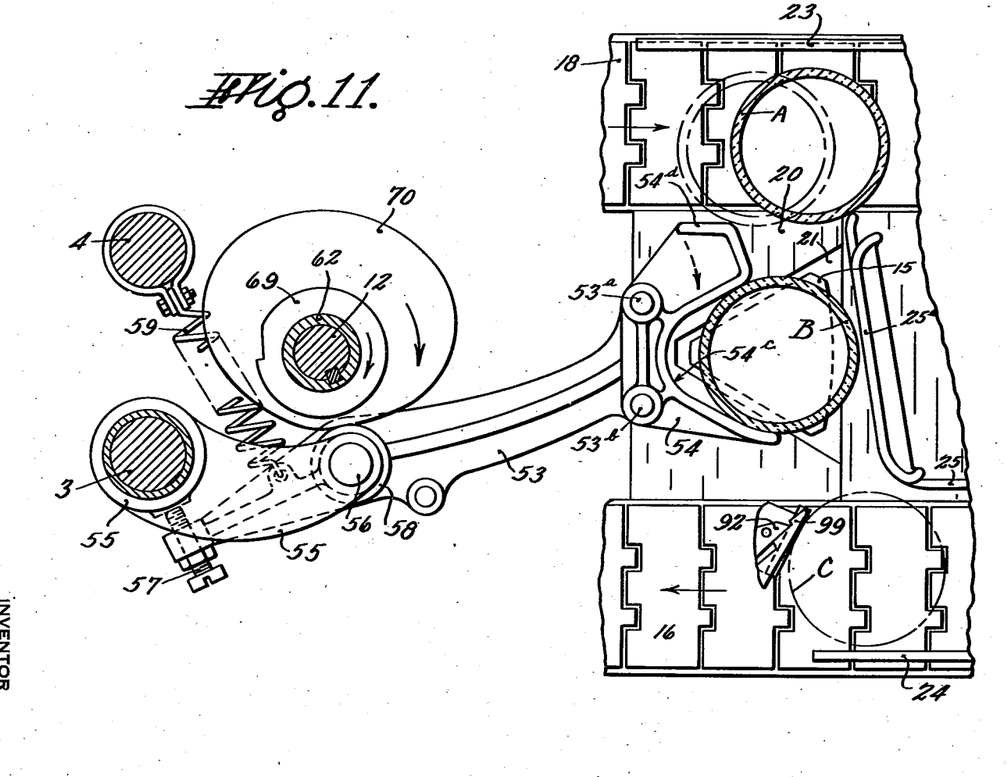
Fig. 11 is a similar plan with certain of the parts omitted to show the transfer member completing the transfer of bottle A to the outfeed conveyor, bottle B to the elevator platform, and the stopping of a third bottle C on the infeed conveyor.

The transfer lever 53 carries at its forward end a removable jaw 54 which is detachably mounted upon said transfer lever 53 by means of sockets 54a and 54b of the jaw adapted to fit over prongs 53a and 53b on the lever. The jaw 54 has a bell-mouthed recess 54c shaped to partially embrace a bottle for moving the same from the infeed conveyor 16 over to and on top of the elevator platform 15. The jaw 54 also is provided with an outer ejector face 54d adapted to push a bottle off from the top of the elevator platform 15 while at the same time the recess 54c is bringing onto said platform another bottle as shown in Fig. 11. The anti-clockwise movement of the transfer lever 53 takes place while the elevator platform 15 is down in its lowermost position flush with the transfer plate 20. After placing a bottle on said platform 15 the transfer lever 53 dwells in this position (see Fig. 11) for a slight period while the elevator platform 15 is moved upwardly through the recess 54c of the jaw 54. While the elevator platform 15 is still in its upper position holding the bottle up to the header (not shown), the return or clockwise movement of said lever 53 takes place. At this time the elevator platform mechanism 15 is high enough so that jaw 54 and transfer lever 53 may be swung clockwise beneath said platform elevator 15.

By reason of the triangular shape of the platform elevator 15, bottles of different sizes such as quart or pint bottles may be effectively supported thereon. For the accommodation of smaller bottles the guide 25a is adjusted toward the rear or narrow end of said platform 15 in order to center smaller bottles nearer the narrow end than that shown in dotted line in Fig. 2, it being understood that larger bottles would be centered nearer the wider or forward end of said platform. For embracing bottles of different size the detachable jaw 54 is changed and its recess or mouth 54c can be varied in width over a considerable range for different sized bottles and still be wide enough to permit the upward travel of the platform 15 therethrough as above described. By this arrangement it becomes necessary to change only the jaw 54 for bottles of different size. Obviously there will be other equivalent shapes possible for the triangular shaped platform 15, the essential characteristic of the platform in this respect being that it shall have a relatively wide forward portion tapering to a relatively narrow rear portion as shown. For instance, a T-shape, a Y-shape, or a V-shape for the platform might be successfully used for the purpose described.

In machines of this character, it is desirable that the web feeding mechanism for the bottle hoods and the header applicator mechanism for taping the hoods shall not be operated except when a bottle is fed into a machine in properly timed relation. It has been stated above that the drive for the web feed mechanism (not shown) and for the header applicator mechanism (not shown) is taken from vertical drive shaft 12. Consequently it is only necessary in the present application to describe the means for driving said shaft 12 as determined by the presence of a bottle fed into the machine in properly timed order.

Figure 3:
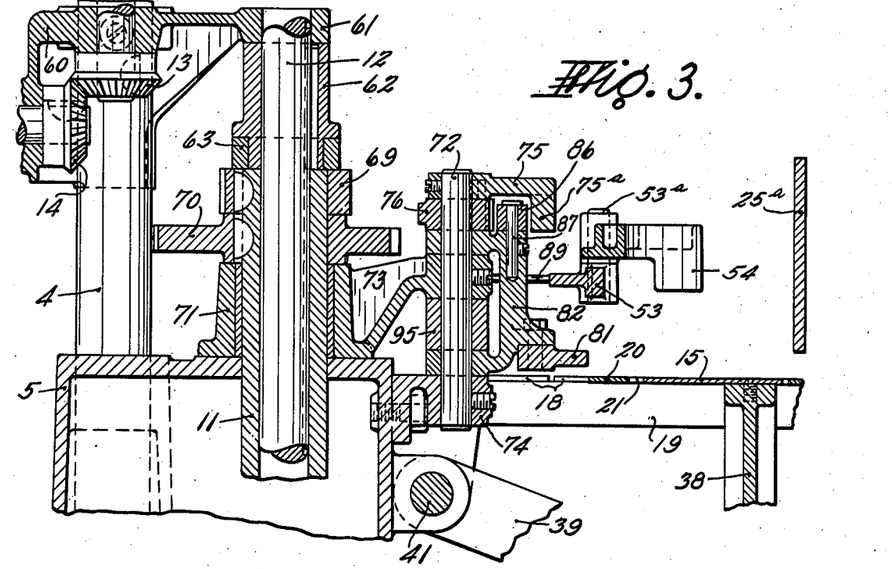
Fig. 3 is a longitudinal sectional view along line 3—3 of Fig. 2.

The bracket housing 60 which embraces the posts 3 and 4 has an integral extension 61 serving as a bearing guide for shaft 12 (see Fig. 3). Keyed to said shaft 12 below said bearing guide 61 is a cushion coupling driven member 62, said member 62 comprising a sleeve portion through which the shaft 12 may slide vertically and having forked extensions 62a and 62b between which lies an arm 63a of a cushion coupling driving member 63. Cushion springs 64 and 64a are located between the arm 63a and extensions 62a and 62b. A coupling pawl 65 is pivoted at 66 on member 63 and a spring 68 carried in a suitable housing on member 63 tends to keep said pawl 65 in a clockwise turned position, whereby it will engage and lock with the single tooth drive ratchet 69, the latter being fixed to tubular drive shaft 11. It will be understood that when the coupling pawl 65 is engaged with the ratchet 69, tubular shaft 11 will act to drive synchronously therewith the interior solid shaft 12 through the mechanism above described. On the other hand, when coupling pawl 65 is disengaged from the ratchet 69 there will be no driving connection between shafts 11 and 12. This engagement and disengagement of the drive between the shafts 11 and 12 is determined by the presence of a bottle coming into the machine in properly timed order.

Referring to Fig. 3, the bearing hub 71 for shafts 11 and 12 has an extension bracket 73 which serves as an upper guide for a vertical bearing rod 72 and a lower extension bracket 74 furnishes the lower guide for said bearing rod 72. Fixed to the upper end of said rod 72 is a cap piece 75 which has a depending cam portion 75a. Pivotally mounted on said rod 72 beneath the cap piece 75 is a disconnector lever 76, one arm of which carries an upturned hook 79 adapted to engage the tail-end 67 of the coupling pawl 65 and cause disconnection of said coupling pawl from its ratchet 69. A spring 77 is connected to the other arm of said disconnector lever 76 and to an anchor bracket 78 normally tending to turn said disconnector lever clockwise, whereby its hook 79 will be in position to engage and disconnect coupling pawl 65. At proper times this disconnector lever 76 is rendered ineffective so that the coupling pawl 65 will be allowed to connect with the ratchet 69.

Mounted below the disconnector lever 76 and pivoted on the bearing rod 72 is a yoke member 82 which carries fixed thereto at its lower portion a stop lever 81. Upon the upper portion of the yoke member 82 is pivotally mounted at 87 a throw-out dog 86 adapted to engage a lug 80 integral with the disconnector lever 76 for throwing said disconnector lever into its inoperative position. A spring 88 is connected to said dog 86 and to a fixed bracket 89 which tends to throw said dog into effective engagement behind the lug 80 whenever the stop lever 81 is swung far enough in a counterclockwise direction. The depending cam portion 75a of cap piece 75 engages the tail-end of said dog 86 to disengage the dog from lug 80 and release the disconnector lever 76 for effective action whenever the stop lever 81 is thrown far enough in its counterclockwise direction.

The pivoted yoke 82 carrying the stop lever 81 has a projecting arm 83 between which and the stationary part of the frame 85 there is connected a return spring 84 tending to swing the stop lever in an anti-clockwise direction. The movement of said stop lever in this direction is limited by an adjustable screw stud 90 which abuts against the hub of extension bracket 73.

The normal position of stop lever 81 is as shown in Fig. 2, wherein it presents a stop surface 91 to the path of bottles being fed inwardly by the infeed conveyor 16. A latch 92 is pivoted at 94 for a limited movement at the outer end of said stop lever 81 and a spring 93 normally tends to keep this latch 92 in its outward position. A pullout lever 95 is also mounted on bearing rod 72 adjacent the stop lever 81. The pullout lever 95 is swung back and forth with the transfer lever 53 by means of a connecting link 96 which connects at 97 with the pullout lever 95 and at 98 with a transfer lever 53. A latch hook 99 is pivoted at 100 at the outer end of the pullout lever 95 and a spring 101 is provided tending to normally hold said latch outwardly in a clockwise direction. The rear end of said pivoted latch 99 abuts against an adjustable stud 102 which limits the clockwise movement of the latch. This latch hook is adapted to engage the latch 92 of the stop lever 81 at proper times for carrying the stop lever with the pullout lever in clockwise direction. The return movement of said stop lever is effected by the return spring 84.

The operation of the apparatus may be briefly described as follows:

Referring to Fig. 2 there is shown coming in on the infeed conveyor 16, two bottles A and B. Leading bottle A however has not traveled far enough on the conveyor to push the latch hook 99 into engagement with latch 92 of the stop lever 81. Consequently the further operation will find the pullout lever 95 moved to the position as shown in Fig. 8, leaving the stop lever 81 in position to stop the leading bottle A.

Figure 8:
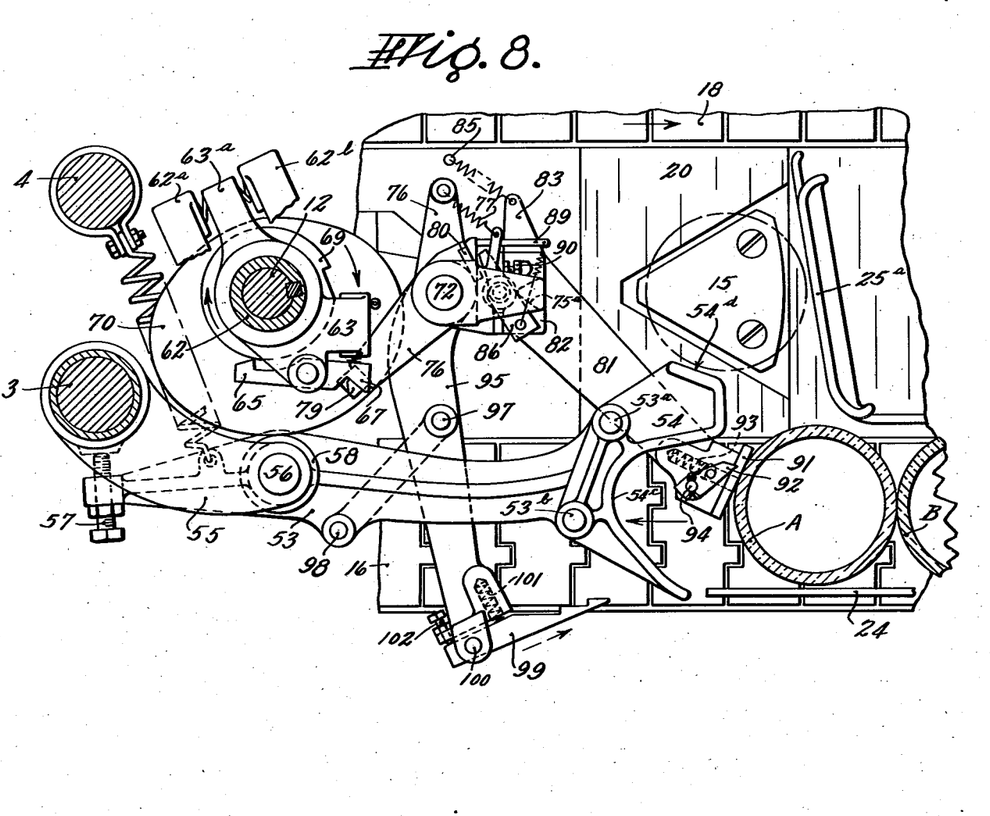
Fig. 8 is a plan similar to that of Fig. 2 showing the parts in a later phase of the operation; viz., when the bottle A arrives just too late for being transferred to the elevator platform and is therefore stopped until the mechanism is ready to receive it.

It will be observed that in this position of the parts shown in Fig. 8 the disconnector 76 is in its active position for disconnecting pawl 65, and consequently there is no drive connection acting between shafts 11 and 12, and shaft 12 together with parts driven therefrom, is idle. This condition resulted from the fact that the bottle A did not arrive soon enough to be transferred to the elevator platform 15.

Figure 9:
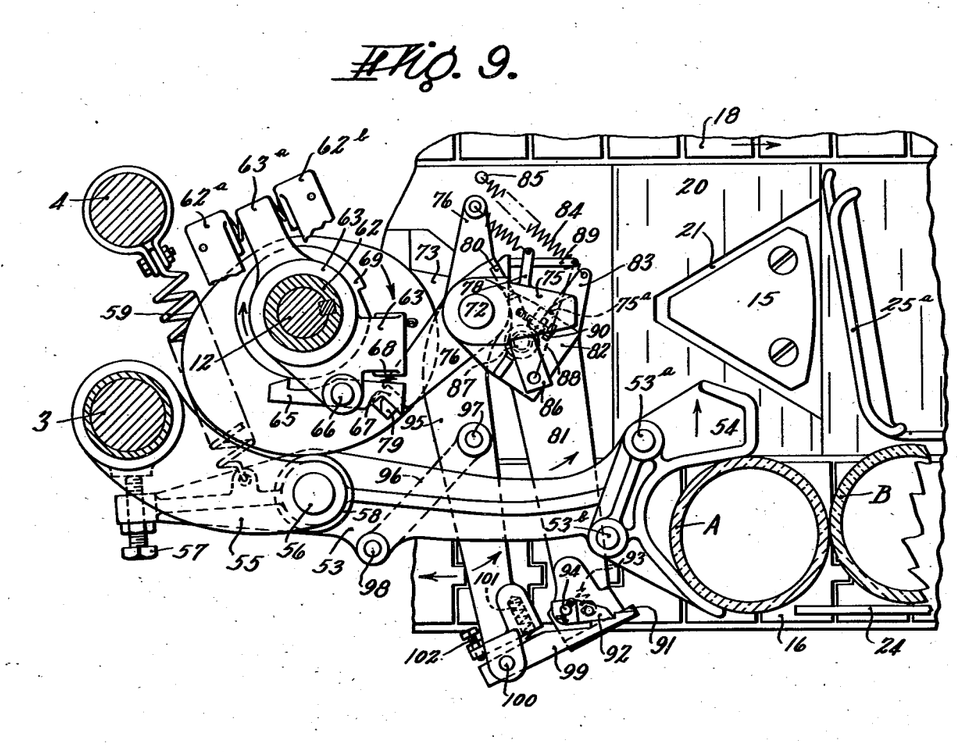
Fig. 9 is a similar plan showing the position of the same parts when the bottle A arrives in time for a transfer.
Figure 10:
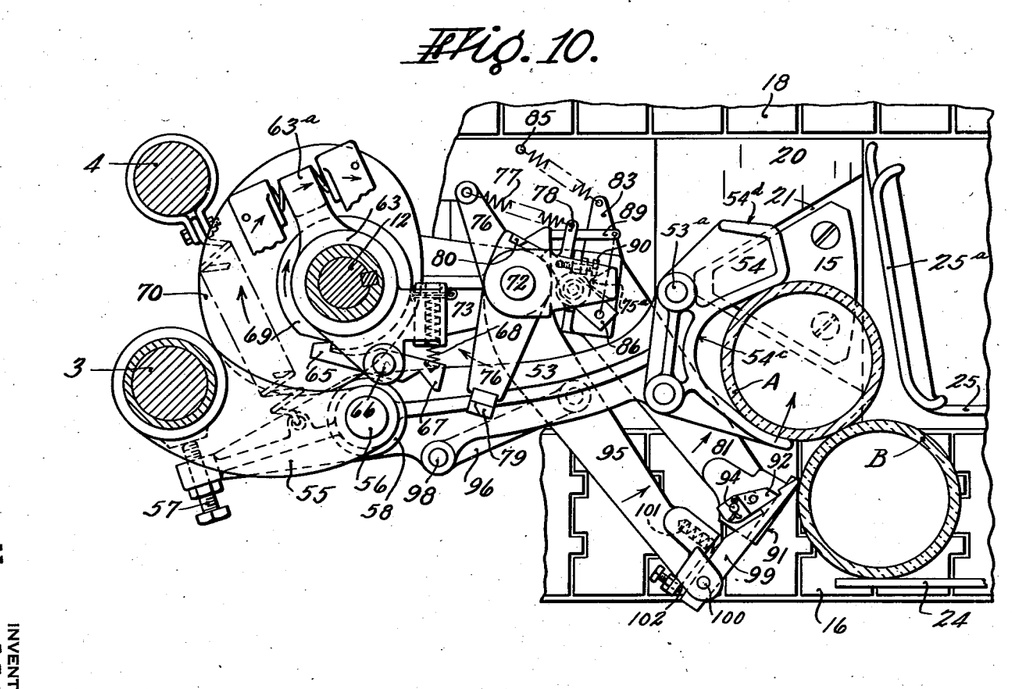
Fig. 10 is a view of the parts in similar plan showing the bottle A being transferred to the elevator platform in properly timed relation and the next bottle B being held up until its turn comes for being transferred.

On the subsequent swing in and out of the pullout lever 95, its latch hook 99 will withdraw the stop lever 81 as shown in Fig. 9 and in this case the bottle A will be moved into the jaw 54 ready for transfer to the elevator platform 15. At the same time the throw-out dog 86 has engaged behind lug 80 and on the next swing in of the stop lever 81, will throw out the disconnector 76. This will permit the coupling pawl 65 to connect the shafts 11 and 12 for operation of the latter all as shown in Fig. 10. In this view the transfer lever 53 is carrying bottle A onto the elevator platform 15 and the next bottle B is being held back by the stop lever 81 until its turn comes for being transferred. The presence of bottle B in this position shown in Fig. 10 insures that the latch hook 99 will engage latch 92 for withdrawing the stop lever 81 on the next swing outwardly.

In Fig. 11 the parts have been moving through a complete cycle, bottle A has been hooded and has been pushed off the platform 15 onto the outfeed conveyor by the ejector face 54d, bottle B has been brought to the elevator platform 15, and a third bottle C has arrived on the infeed conveyor in time to press hook 99 into engagement with latch 92 so that the operations will continue without interruption.

Figure 12:
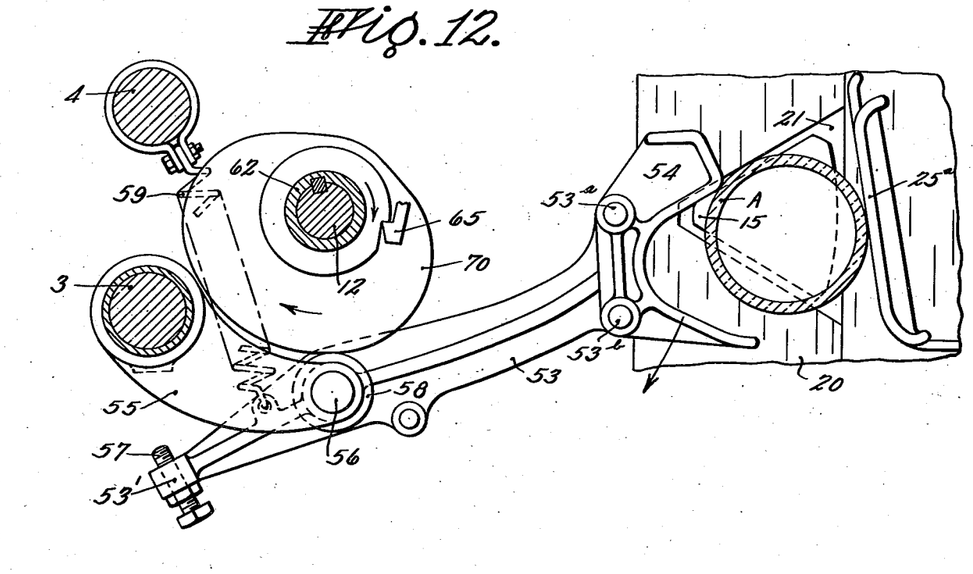
Fig. 12 is a plan of parts similar to that of Fig. 11, to show the yielding action of the transfer member upon interference with its return movement.

Fig. 12 illustrates what happens when by any accident or other interference the return or clockwise swing of the transfer lever 53 is blocked. In this view it is assumed that for some reason or another the elevation platform 15 did not rise in time to allow the jaw 54 swinging clockwise to pass beneath said platform 15. In such an event the knuckle connection at 56 between swing arm 55 and lever 53 is pushed out or "jack-knifed" by cam 70 and the rear end 53' of the lever 53 is pushed away from the hub of swing arm 55. As soon as the interference is removed the parts will resume their normal position under stress of spring 59. This yielding action avoids breakage of the parts when such interference occurs.

What I claim is:

1. In a machine for operating on containers, an elevator platform having up and down movement, an infeed conveyor and an outfeed conveyor arranged one at each side of said platform, and a swinging transfer member operable to move containers in successive steps from said infeed conveyor onto said platform and from said platform onto said outfeed conveyor, said transfer member comprising a swing arm and a lever pivoted thereon at a knuckle joint, an operating cam acting on said member at said knuckle joint, a spring tending to keep said lever and arm swinging together in fixed relation as a single member about the pivotal mount of said arm but permitting said lever and arm to "jack-knife" about said knuckle joint when said member meets resistance to its normal swinging movement.

2. In a machine for operating on containers, an elevator platform having up and down movement, an infeed conveyor, a swinging transfer member operated to move containers from said conveyor onto said platform, means for releasing containers in timed relation to a cyclic operation of the machine comprising a stop lever movable in and out of stopping position with respect to containers on said conveyor, a pullout lever having means for being connected to said stop lever as determined by the presence of a container against said stop lever, a link connection between said pullout lever and said transfer member for operating the former from the latter, and a cam for actuating said transfer member.

3. In a machine for operating on containers, a conveyor to feed containers to said machine, a driving shaft and a driven shaft in said machine, means for coupling said shafts together for a driving connection comprising a pawl carrying member on one of said shafts, a ratchet member on the other shaft, a spring normally tending to engage said pawl and said ratchet for coupling said shafts together, a disconnector lever and a spring normally holding the same in a position to disconnect said pawl from said ratchet, a stop lever movable in and out of stopping position with respect to containers on said conveyor, a throw-out dog on said stop lever acting on the movement of said stop lever to render ineffective said disconnector, a pullout lever having a periodic movement and means for connecting said pullout member to said stop lever to withdraw the latter from its container stopping position, the action of said connecting means being determined by the presence of a container at said stop lever.

4. In a machine for operating on containers, an elevator platform having a vertically reciprocating movement to upper and lower positions, an infeed conveyor and an outfeed conveyor arranged one at each side of said platform, a transfer member having a reciprocating movement in a horizontal plane, operating means for said transfer member causing the same to transfer a container from said infeed conveyor onto said platform, said transfer member comprising a jaw with fixed outwardly flaring sides adapted to fit against the sides of a container, said platform being shaped with a relatively wide forward portion and a relatively narrow rearward portion whereby smaller containers may be centered on said platform nearer its rearward and narrower portion, and larger containers may be centered on said platform nearer its forward and wider portion; the sides of said platform adapted to be embraced by and spaced from the flaring sides of said jaw for a free movement of the platform vertically with respect to said jaw after a container has been transferred on said platform by said jaw whereby different sized containers may be handled on said platform with merely a change in the size of said jaw member.

5. In a machine for operating on containers, an elevator platform, an infeed conveyor, and an outfeed conveyor, with their conveying surfaces in substantially the same plane and arranged one at each side of said elevator platform, means to move said elevator to upper and lower positions, the supporting surface of said elevator in its lower position being coincident in plane with said conveying surfaces, a transfer member adapted to engage containers in transferring the same onto and off from said platform, and means for operating the transfer member in back and forth movements, both in the same path, with its active transferring stroke passing above said platform when the latter is down and with its idle return stroke passing below said platform when the latter is up.

6. In a machine for operating on containers, an elevator platform, an infeed conveyor, and an outfeed conveyor, with their conveying surfaces in substantially the same plane and arranged one at each side of said elevator platform, means to move said elevator to upper and lower positions, the supporting surface of said elevator in its lower position being coincident in plane with said conveying surfaces, a transfer member adapted to engage containers in transferring the same onto and off from said platform, and means for operating the transfer member in back and forth movements, both in the same path, with its active transferring stroke passing above said platform when the latter is down and with its idle return stroke passing below said platform when the latter is up, said operating means for the transfer member comprising yieldable connections operable in both directions of movement of said transfer member to allow stoppage of said transfer member by an interfering engagement thereof with said platform while the machine is in operation.

7. In a machine for operating on containers, an elevator platform, an infeed conveyor, and an outfeed conveyor, with their conveying surfaces in substantially the same plane and arranged one at each side of said elevator platform, means to move said elevator to upper and lower positions, the supporting surface of said elevator in its lower position being coincident in plane with said conveying surfaces, a transfer member comprising a jaw with spaced apart sides adapted to receive a container therebetween, one side of said jaw serving to engage and transfer a container from the infeed conveyor onto said platform while the other side of said jaw serves to simultaneously engage and transfer a container from said platform onto said outfeed conveyor, and means for operating the transfer member in back and forth movements, both in the same path, with its active transferring stroke passing above said platform when the latter is down and with its idle return stroke passing below said platform when the latter is up.

NORMAN W. LYON.